(12) United States Patent
Bao et al.

(10) Patent No.: US 10,952,228 B2
(45) Date of Patent: Mar. 16, 2021

(54) TRAFFIC SCHEDULING AND PROCESSING METHOD, USER SIDE TRANSLATOR AND CORE TRANSLATOR

(71) Applicant: Tsinghua University, Beijing (CN)

(72) Inventors: Congxiao Bao, Beijing (CN); Xing Li, Beijing (CN)

(73) Assignee: TSINGHUA UNIVERSITY

( * ) Notice: Subject to any disclaimer, the term of this patent is extended or adjusted under 35 U.S.C. 154(b) by 0 days.

(21) Appl. No.: 16/297,433

(22) Filed: Mar. 8, 2019

(65) Prior Publication Data

US 2019/0281611 A1 Sep. 12, 2019

(30) Foreign Application Priority Data

Mar. 9, 2018 (CN) .......................... 201810196466.1

(51) Int. Cl.
*H04W 72/12* (2009.01)
*H04L 29/12* (2006.01)
(Continued)

(52) U.S. Cl.
CPC ..... *H04W 72/1231* (2013.01); *H04L 61/2575* (2013.01); *H04L 69/18* (2013.01); *H04W 28/0215* (2013.01); *H04L 61/6086* (2013.01)

(58) Field of Classification Search
CPC .......... H04W 72/1231; H04W 28/0215; H04L 61/2575; H04L 69/18; H04L 61/6086;
(Continued)

(56) References Cited

U.S. PATENT DOCUMENTS

2003/0193965 A1 10/2003 Higuchi et al.
2012/0207168 A1* 8/2012 Kassi Lahlou ... H04L 29/12358
370/392

FOREIGN PATENT DOCUMENTS

CN 102098355 A 6/2011
CN 102098356 A 6/2011
(Continued)

OTHER PUBLICATIONS

RFC 7915, "IP/ICMP Translation Algorithm," Jun. 2016, IETF.*
(Continued)

*Primary Examiner* — Jae Y Lee
(74) *Attorney, Agent, or Firm* — Morriss O'Bryant Compagni Cannon, PLLC

(57) ABSTRACT

By deploying a user-side translator at the access point of the user terminal with a first-type Internet, deploying a plurality of core translators between multiple uplink lines of the first-type Internet and a second-type Internet, and allowing the user to select a corresponding core translator to process message according to the usage state of the uplink line, the traffic scheduling and processing method, the user-side translator, the core translator and the traffic scheduling system provided by the embodiments of the present application allow the user to dynamically adjust the use of uplink lines. The solution is capable of achieving the function of software-defined wide area network SD-WAN with the first-type Internet protocol/second-type Internet protocol translation technology, which is of great significance for reducing the network running cost and improving the network performance experience of the user.

9 Claims, 6 Drawing Sheets

(51) Int. Cl.
*H04L 29/06* (2006.01)
*H04W 28/02* (2009.01)

(58) Field of Classification Search
CPC . H04L 45/741; H04L 61/6059; H04L 61/251; H04L 69/08; H04L 47/24; H04L 61/2503
See application file for complete search history.

(56) References Cited

FOREIGN PATENT DOCUMENTS

| | | |
|---|---|---|
| CN | 102904976 A | 1/2013 |
| CN | 103856581 A | 6/2014 |

OTHER PUBLICATIONS

Han, Guoliang et al., Stateless Communication Mechanism Between an IPv4 Network and the IPv6 Internet, Journal of Computer Applications, 35(8):2113-2117, 2123 Aug. 10, 2015, http://www.joca.cn, doi:10.11772/j.issn.1001-9081.2015.08.2113.
Bao, Congxiao et al., IVI/MAP-T/MAP-E: Unified IPv4/IPv6 Stateless Translation and Encapsulation Technologies, ZTE Technology Journal, Apr. 2013, pp. 7-11, vol. 19, No. 2, http://www.cnki.net/kcms/detail/34.1228.TN.20130228.1703.003.html, DOI: 10.3969/j.issn.1009-6868.2013.02.002.

* cited by examiner

TRAFFIC SCHEDULING AND PROCESSING METHOD, USER SIDE TRANSLATOR AND CORE TRANSLATOR

CROSS-REFERENCE TO RELATED APPLICATIONS

This application claims priority to Chinese Patent Application No. 201810196466.1 filed on Mar. 9, 2018, the entirety of which is incorporated by this reference.

TECHNICAL FIELD

The embodiments of the present application relate to the technical field of computer network, and specifically to a traffic scheduling and processing method, a user-side translator, a core translator and a traffic scheduling system.

BACKGROUND

The Internet based on packet-switching has now become the most important information infrastructure in the world. The Internet is characterized by good scalability, strong survivability, high flexibility, ubiquity and etc. However, the current design concept of "connectionless, end-to-end and best-effort" for the Internet also brings significant problems of poor security, non-guaranteed quality of service (QoS), unclear economic model for sustainable development and etc. When a user has multiple uplink lines, the conventional BGP (Border Gateway Protocol)-based traffic scheduling method cannot meet the requirements of the user to dynamically adjust the use of uplink lines.

SUMMARY

In view of the defects and shortcomings of the prior art, the embodiments of the present application provide a traffic scheduling and processing method, a user-side translator, a core translator and a traffic scheduling system.

In one aspect, the embodiments of the present application provide a traffic scheduling and processing method, including:

a user-side translator receiving a first-type Internet protocol message sent by a user terminal, and selecting a corresponding core translator according to a usage state of an uplink line; wherein the user-side translator is deployed at an access point of the user terminal with a first-type Internet which is a network transmitting the first-type Internet protocol messages; a plurality of core translators are deployed between multiple uplink lines of the first-type Internet and a second-type Internet which is a network transmitting second-type Internet protocol messages; the corresponding core translator is selected from the plurality of core translators that are deployed;

translating the first-type Internet protocol message into the second-type Internet protocol message, and sending the second-type Internet protocol message to the corresponding core translator;

receiving the second-type Internet protocol message sent by the corresponding core translator, translating the second-type Internet protocol message into the first-type Internet protocol message, and sending the translated first-type Internet protocol message to the user terminal.

In another aspect, the embodiments of the present application provide a traffic scheduling and processing method, including:

a core translator receiving a second-type Internet protocol message sent by a user-side translator, translating the second-type Internet protocol message into a first-type Internet protocol message, mapping the translated first-type Internet protocol message, and sending the mapped first-type Internet protocol message to an Internet server so that the Internet server feeds back a first-type Internet protocol message configured to provide services according to the first-type Internet protocol message sent by the core translator; wherein the user-side translator is deployed at an access point of a user terminal with a first-type Internet which is a network transmitting the first-type Internet protocol messages; the core translators is deployed between an uplink line of the first-type Internet and a second-type Internet which is a network transmitting the second-type Internet protocol messages; the Internet server applies a first-type Internet protocol;

the core translator receiving the first-type Internet protocol message fed back by the Internet server, mapping the first-type Internet protocol message fed back by the Internet server, translating the mapped first-type Internet protocol message into the second-type Internet protocol message, and sending the translated second-type Internet protocol message to the user-side translator so that the user-side translator translates the second-type Internet protocol message into the first-type Internet protocol message, and sends the translated first-type Internet protocol message to a corresponding user terminal.

In a third aspect, the embodiments of the present application provide a user-side translator, which is deployed at an access point of a user terminal with a first-type Internet, and includes:

a selecting unit configured to receive a first-type Internet protocol message sent by the user terminal, and select a corresponding core translator according to a usage state of an uplink line; wherein a first-type Internet which is a network transmitting the first-type Internet protocol messages; a plurality of core translators are deployed between multiple uplink lines of the first-type Internet and a second-type Internet which is a network transmitting second-type Internet protocol messages; the corresponding core translator is selected from the plurality of core translators that are deployed;

a first-type translating unit configured to translate the first-type Internet protocol message into the second-type Internet protocol message, and send the second-type Internet protocol message to the corresponding core translator;

a second-type translating unit configured to receive the second-type Internet protocol message sent by the corresponding core translator, translate the second-type Internet protocol message into the first-type Internet protocol message, and send the translated first-type Internet protocol message to the user terminal.

In a fourth aspect, the embodiments of the present application provide a core translator, including:

a third translating unit configured to receive a second-type Internet protocol message sent by a user-side translator, translate the second-type Internet protocol message into a first-type Internet protocol message, map the translated first-type Internet protocol message, and send the mapped first-type Internet protocol message to an Internet server so that the Internet server feeds back a first-type Internet protocol message configured to provide services according to the first-type Internet protocol message sent by the core translator; wherein the user-side translator is deployed at an access point of a user terminal with a first-type Internet which is a network transmitting the first-type Internet protocol messages; the core translators is deployed between an uplink line of the first-type Internet and a second-type Internet which is a network transmitting the second-type Internet protocol messages; the Internet server applies a first-type Internet protocol;

a fourth translating unit configured to receive the first-type Internet protocol message fed back by the Internet server, map the first-type Internet protocol message fed back by the Internet server, translate the mapped first-type Internet protocol message into the second-type Internet protocol message, and send the translated second-type Internet protocol message to the user-side translator so that the user-side translator translates the second-type Internet protocol message into the first-type Internet protocol message, and sends the translated first-type Internet protocol message to a corresponding user terminal.

In a fifth aspect, the embodiments of the present application provide a traffic scheduling system, including:

the user-side translator and the core translator above.

In a sixth aspect, the embodiments of the present application provide an electronic device, including a processor, a memory, a bus and computer programs that are stored in the memory and can be executed by the processor;

wherein the processor and the memory communicate with each other through the bus;

the processor implements the methods above when executing the computer programs.

In a seventh aspect, the embodiments of the present application provide a non-transitory computer readable storage medium, in which computer programs are stored, wherein the methods above are implemented when the computer programs are executed by a processor.

By deploying the user-side translator at the access point of the user terminal with the first-type Internet, deploying a plurality of core translators between multiple uplink lines of the first-type Internet and the second-type Internet, and allowing the user to select a corresponding core translator to process message according to the usage state of the uplink line, the traffic scheduling and processing method, the user-side translator, the core translator and the traffic scheduling system provided by the embodiments of the present application allow the user to dynamically adjust the use of uplink lines. The solution is capable of achieving the function of software-defined wide area network SD-WAN with the first-type Internet protocol/second-type Internet protocol translation technology, which is of great significance for reducing the network running cost and improving the network performance experience of the user.

DETAILED DESCRIPTION

In order to make the objectives, technical solutions, and advantages of the embodiments of the present application clearer, the technical solutions of the embodiments of the present application will be described clearly with reference to the accompanying drawings hereinafter. Obviously, the described embodiments are merely some but not all of the embodiments of the present application. On the basis of the embodiments of the present application, all other embodiments obtained by the person of ordinary skill in the art without creative work shall fall within the protection scope of the embodiments of the present application.

Figure 1:
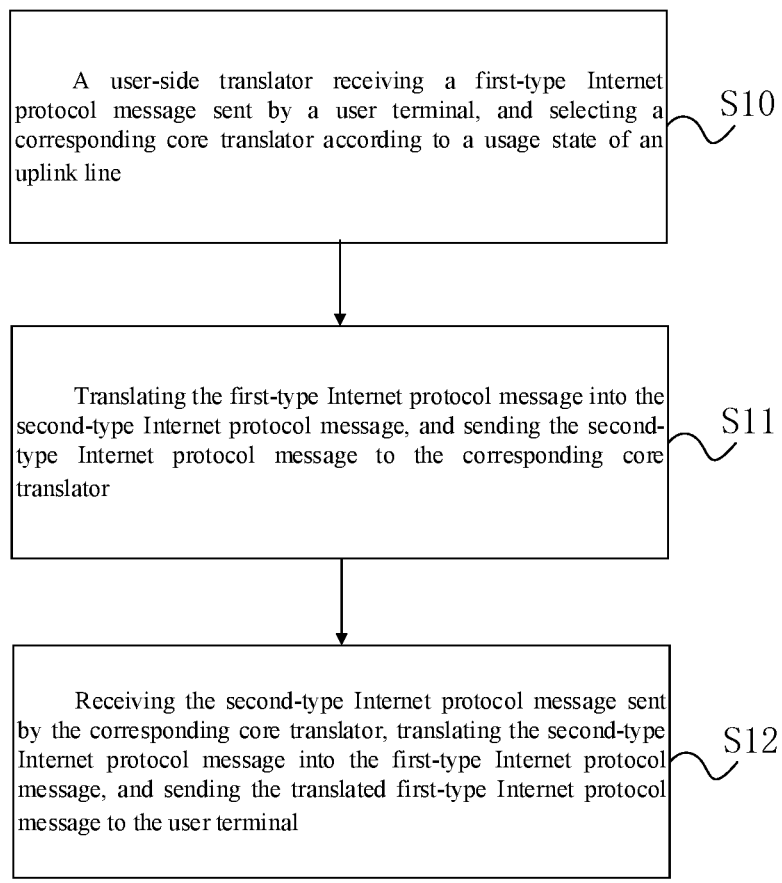
FIG. 1 is a flowchart of the traffic scheduling and processing method according to an embodiment of the present application.

As shown in FIG. 1, the present embodiment provides a traffic scheduling and processing method, including:

S10, a user-side translator receiving a first-type Internet protocol message sent by a user terminal, and selecting a corresponding core translator according to a usage state of an uplink line; wherein the user-side translator is deployed at an access point of the user terminal with a first-type Internet which is a network transmitting the first-type Internet protocol messages; a plurality of core translators are deployed between multiple uplink lines of the first-type Internet and a second-type Internet which is a network transmitting second-type Internet protocol messages; the corresponding core translator is selected from the plurality of core translators that are deployed;

S11, translating the first-type Internet protocol message into the second-type Internet protocol message, and sending the second-type Internet protocol message to the corresponding core translator;

S12, receiving the second-type Internet protocol message sent by the corresponding core translator, translating the second-type Internet protocol message into the first-type Internet protocol message, and sending the translated first-type Internet protocol message to the user terminal.

In the traffic scheduling and processing method provided by the embodiment of the present application, the user-side translator first receives the first-type Internet protocol message sent by the user terminal, and selects the corresponding core translator according to the usage state of the uplink line; then translates the first-type Internet protocol message into the second-type Internet protocol message, and sends the second-type Internet protocol message to the corresponding core translator; and finally receives the second-type Internet protocol message sent by the corresponding core translator, translates the second-type Internet protocol message into the first-type Internet protocol message, and sends the translated first-type Internet protocol message to the user terminal. Therefore the whole solution allows the user to select a corresponding core translator to process the messages according to the usage state of the uplink line, so that the user can dynamically adjust the use of uplink lines.

On the basis of the method embodiment above, selecting the corresponding core translator according to the usage state of the uplink line may include:

selecting the corresponding core translator according to a congestion level of the uplink line, network performances, a public address usage rate of the first-type Internet protocol, a delay demand and a concurrent process demand, when determining that the first-type Internet protocol message is sent by a new communication process.

On the basis of the method embodiments above, selecting the corresponding core translator according to the usage state of the uplink line may include:

selecting a core translator used by an old communication process sending the message of the first-type Internet protocol as the corresponding core translator, when determining the first-type Internet protocol message is sent by the old communication process.

On the basis of the method embodiments above, the user-side translator and the core translator are pre-configured with prefixes of the second-type Internet protocol.

Wherein, translating the first-type Internet protocol message into the massage of the second-type Internet protocol may include:

translating the first-type Internet protocol message into the second-type Internet protocol message with a target address being the prefix of the second-type Internet protocol of the corresponding core translator and a source address being the prefix of the second-type Internet protocol of the user-side translator, according to address translation international standard RFC6052 and protocol translation international standard RFC7915.

In the present embodiment, prefixes of the second-type Internet protocol of different user-side translators cannot be overlapped, and the prefixes of the second-type Internet protocol of different core translators cannot be overlapped either.

On the basis of the method embodiments above, the first-type Internet protocol may be the fourth version of the Internet protocol IPv4, and the second-type Internet protocol may be the sixth version of the Internet Protocol IPv6.

Figure 2:
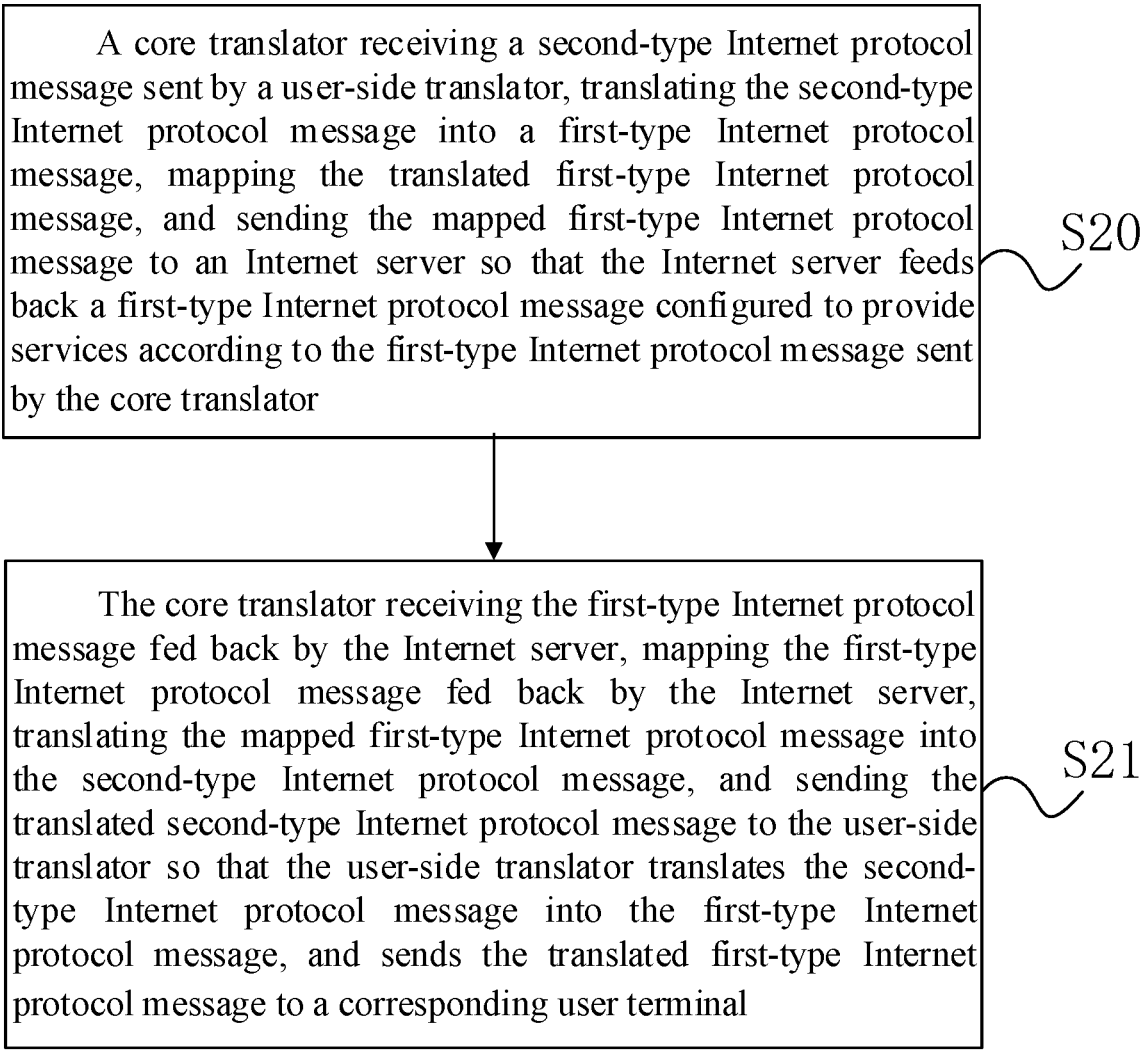
FIG. 2 is a flowchart of the traffic scheduling and processing method according to an embodiment of the present application.

As shown in FIG. 2, the present embodiment provides a traffic scheduling and processing method, including:

S20, a core translator receiving a second-type Internet protocol message sent by a user-side translator, translating the second-type Internet protocol message into a first-type Internet protocol message, mapping the translated first-type Internet protocol message, and sending the mapped first-type Internet protocol message to an Internet server so that the Internet server feeds back a first-type Internet protocol message configured to provide services according to the first-type Internet protocol message sent by the core translator; wherein the user-side translator is deployed at an access point of a user terminal with a first-type Internet which is a network transmitting the first-type Internet protocol messages; the core translators is deployed between an uplink line of the first-type Internet and a second-type Internet which is a network transmitting the second-type Internet protocol messages; the Internet server applies a first-type Internet protocol;

S21, the core translator receiving the first-type Internet protocol message fed back by the Internet server, mapping the first-type Internet protocol message fed back by the Internet server, translating the mapped first-type Internet protocol message into the second-type Internet protocol message, and sending the translated second-type Internet protocol message to the user-side translator so that the user-side translator translates the second-type Internet protocol message into the first-type Internet protocol message, and sends the translated first-type Internet protocol message to a corresponding user terminal.

In the traffic scheduling and processing method provided by the embodiment of the present application, the core translator first receives the second-type Internet protocol message sent by the user-side translator, translates the second-type Internet protocol message into the first-type Internet protocol message, maps the translated first-type Internet protocol message, and sends the mapped first-type Internet protocol message to the Internet server so that the Internet server feeds back the first-type Internet protocol message configured to provide services according to the first-type Internet protocol message sent by the core translator; then receives the first-type Internet protocol message fed back by the Internet server, maps the first-type Internet protocol message fed back by the Internet server, translates the mapped first-type Internet protocol message into the second-type Internet protocol message, and sends the translated second-type Internet protocol message to the user-side translator so that the user-side translator translates the second-type Internet protocol message into the first-type Internet protocol message, and sends the translated first-type Internet protocol message to the corresponding user terminal. Therefore, by means of the message processing of the core translator, the whole solution is convenient for the user to dynamically adjust the use of the uplink line according to the usage state of the uplink line.

On the basis of the method embodiment above, translating the second-type Internet protocol message into the first-type Internet protocol message may include:

translating the second-type Internet protocol message into the first-type Internet protocol message according to address translation international standard RFC6052 and protocol translation international standard RFC7915.

Wherein, mapping the translated first-type Internet protocol message includes:

performing a NAT (Network Address Translation) mapping on the translated first-type Internet protocol message.

Mapping the first-type Internet protocol message fed back by the Internet server includes:

performing a NAT mapping on the first-type Internet protocol message fed back by the Internet server.

Translating the mapped first-type Internet protocol message into the second-type Internet protocol message includes:

translating the NAT-mapped first-type Internet protocol message into the second-type Internet protocol message according to address translation international standard RFC6052 and protocol translation international standard RFC7915.

On the basis of the method embodiments above, the user-side translator and the core translator are pre-configured with prefixes of the second-type Internet protocol.

Wherein translating the NAT-mapped first-type Internet protocol message into the second-type Internet protocol message according to RFC6052 and RFC7915 may include:

translating the NAT-mapped first-type Internet protocol message into the second-type Internet protocol message with a target address being the prefix of the second-type Internet protocol of the user-side translator and a source address being the prefix of the second-type Internet protocol of the core translator, according to address translation international standard RFC6052 and protocol translation international standard RFC7915.

On the basis of the method embodiments above, the first-type Internet protocol may be the fourth version of the Internet protocol IPv4, and the second-type Internet protocol may be the sixth version of the Internet Protocol IPv6.

Figure 3:
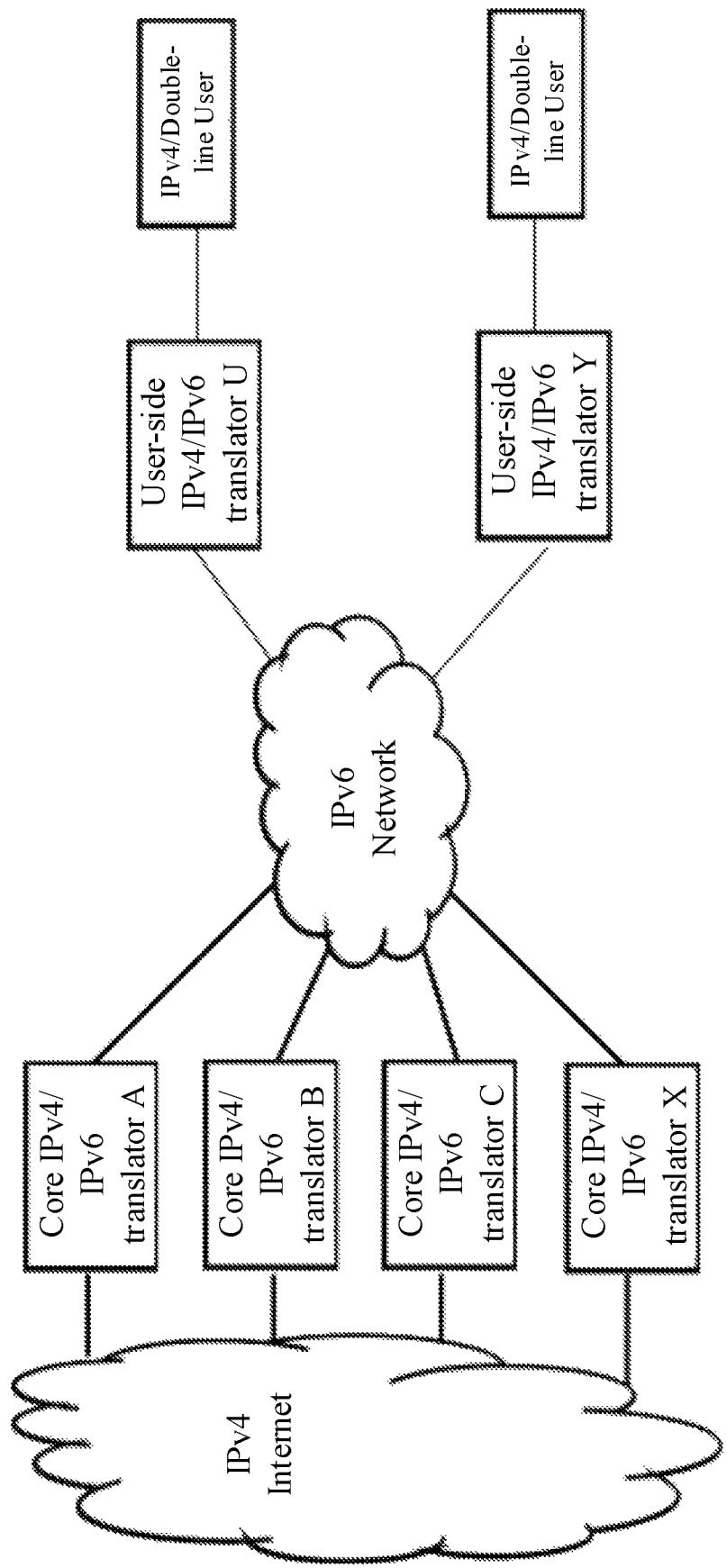
FIG. 3 is an architecture diagram of the structure involved in the entire process of the traffic scheduling and processing method according to another embodiment of the present application.
Figure 4:
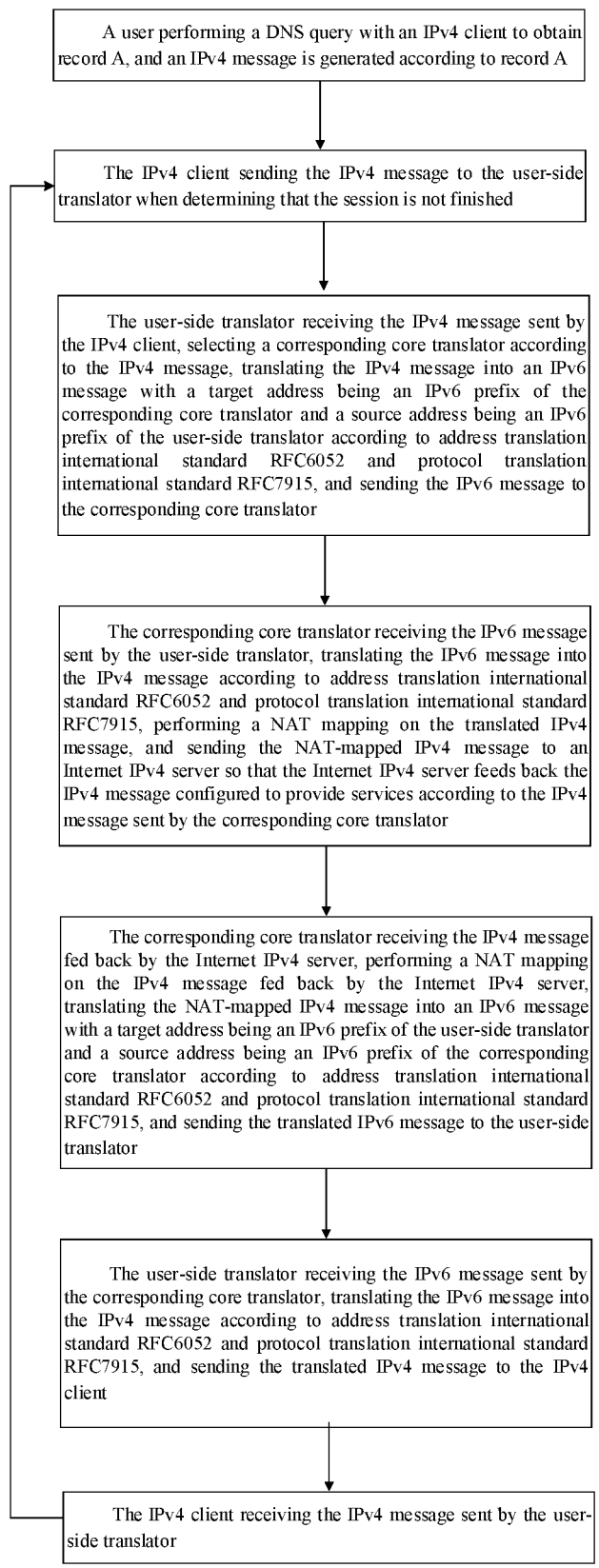
FIG. 4 is a flowchart of the entire process of the traffic scheduling and processing method according to another embodiment of the present application.

The entire process of an embodiment of the traffic scheduling and processing method of the application is illustrated hereinafter with an example that the first-type Internet protocol is the fourth version of the Internet protocol IPv4, and the second-type Internet protocol is the sixth version of the Internet Protocol IPv6. FIG. 3 is an architecture diagram of the structure involved in the entire process, and FIG. 4 is a flowchart of the entire process. As shown in FIG. 3 and FIG. 4, the entire process of an embodiment of the traffic scheduling and processing method of the application is:

an user performing an DNS (Domain Name System) query with an IPv4 client to obtain record A, and an IPv4 message is generated according to record A;

the IPv4 client sending the IPv4 message to the user-side translator when determining that the session is not finished;

the user-side translator receiving the IPv4 message sent by the IPv4 client, selecting a corresponding core translator according to the IPv4 message, translating the IPv4 message into an IPv6 message with a target address being an IPv6 prefix of the corresponding core translator and a source address being an IPv6 prefix of the user-side translator according to address translation international standard RFC6052 and protocol translation international standard RFC7915, and sending the IPv6 message to the corresponding core translator;

the corresponding core translator receiving the IPv6 message sent by the user-side translator, translating the IPv6 message into the IPv4 message according to address translation international standard RFC6052 and protocol translation international standard RFC7915, performing a NAT mapping on the translated IPv4 message, and sending the NAT-mapped IPv4 message to an Internet IPv4 server so that the Internet IPv4 server feeds back the IPv4 message configured to provide services according to the IPv4 message sent by the corresponding core translator.

the corresponding core translator receiving the IPv4 message fed back by the Internet IPv4 server, performing a NAT mapping on the IPv4 message fed back by the Internet IPv4 server, translating the NAT-mapped IPv4 message into an IPv6 message with a target address being an IPv6 prefix of the user-side translator and a source address being an IPv6 prefix of the corresponding core translator according to address translation international standard RFC6052 and protocol translation international standard RFC7915, and sending the translated IPv6 message to the user-side translator;

the user-side translator receiving the IPv6 message sent by the corresponding core translator, translating the IPv6 message into the IPv4 message according to address translation international standard RFC6052 and protocol translation international standard RFC7915, and sending the translated IPv4 message to the IPv4 client.

the IPv4 client receiving the IPv4 message sent by the user-side translator; and the process goes back to the second step.

It should be noted that, the user-side translator is deployed at an access point of an IPv4 user network, and the user-side translator is pre-configured with an IPv6 prefix and an IPv4 private address pool, wherein the IPv6 prefixes of different user-side translators cannot be overlapped, and the IPv4 private address pools of different user-side translators cannot be overlapped either; a plurality of core translators are deployed between multiple uplink lines of the IPv4 Internet and the IPv6 Internet, and each of the deployed core translators is pre-configured with an IPv6 prefix and an IPv4 public address pool, wherein the IPv6 prefixes of different core translators cannot be overlapped, the IPv4 public address pools of different core translator cannot be overlapped either, and the corresponding core translator is selected from the deployed core translators. The IPv4 client can randomly select a user-side translator and send the IPv4 message to the user-side translator when determining that the session is not finished. The corresponding core translator determines, through the IPv6 route, which user-side translator that the translated IPv6 message is sent to.

Figure 5:
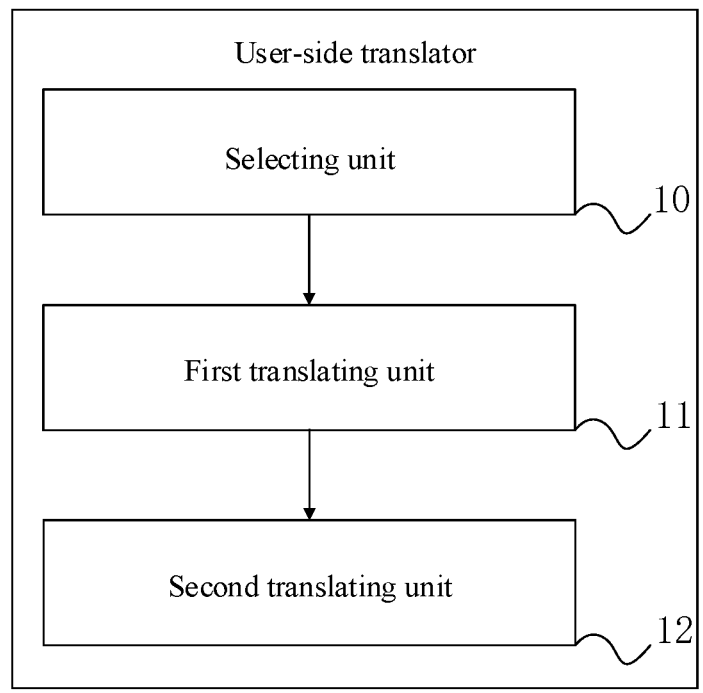
FIG. 5 is a structural diagram of the user-side translator according to an embodiment of the present application.

As shown in FIG. 5, the present embodiment provides a user-side translator, which is deployed at an access point of a user terminal with a first-type Internet, and includes:

a selecting unit 10 configured to receive a first-type Internet protocol message sent by the user terminal, and select a corresponding core translator according to a usage state of an uplink line; wherein a first-type Internet which is a network transmitting the first-type Internet protocol messages; a plurality of core translators are deployed between multiple uplink lines of the first-type Internet and a second-type Internet which is a network transmitting second-type Internet protocol messages; the corresponding core translator is selected from the deployed core translators;

a first-type translating unit 11 configured to translate the first-type Internet protocol message into the second-type Internet protocol message, and send the second-type Internet protocol message to the corresponding core translator;

a second-type translating unit 12 configured to receive the second-type Internet protocol message sent by the corresponding core translator, translate the second-type Internet protocol message into the first-type Internet protocol message, and send the translated first-type Internet protocol message to the user terminal.

Specifically, the selecting unit 10 to receives the first-type Internet protocol message sent by the user terminal, and selects the corresponding core translator according to the usage state of the uplink line; wherein the first-type Internet which is a network transmitting the first-type Internet protocol messages; a plurality of core translators are deployed between multiple uplink lines of the first-type Internet and the second-type Internet which is a network transmitting second-type Internet protocol messages; the corresponding core translator is selected from the deployed core translators; the first-type translating unit 11 translates the first-type Internet protocol message into the second-type Internet protocol message, and sends the second-type Internet protocol message to the corresponding core translator; the second-type translating unit 12 receives the second-type Internet protocol message sent by the corresponding core translator, translates the second-type Internet protocol message into the first-type Internet protocol message, and sends the translated first-type Internet protocol message to the user terminal.

By the selecting unit of the user-side translator receiving the first-type Internet protocol message sent by the user terminal, and selecting the corresponding core translator according to the usage state of the uplink line, by the first-type translating unit translating the first-type Internet protocol message into the second-type Internet protocol message, and sending the second-type Internet protocol message to the corresponding core translator, and by the second-type translating unit receiving the second-type Internet protocol message sent by the corresponding core translator, translating the second-type Internet protocol message into the first-type Internet protocol message, and sending the translated first-type Internet protocol message to the user terminal, the whole solution of the user-side translator provided by the embodiment of the present application allows the user to select the corresponding core translator to process the messages according to the usage state of the uplink line, so that the user can dynamically adjust the use of uplink lines.

The user-side translator of the present embodiment can execute the technical solutions of the corresponding embodiments of the traffic scheduling and processing method above. The implementation principle and technical effects of them are similar, and will not be repeated herein.

Figure 6:
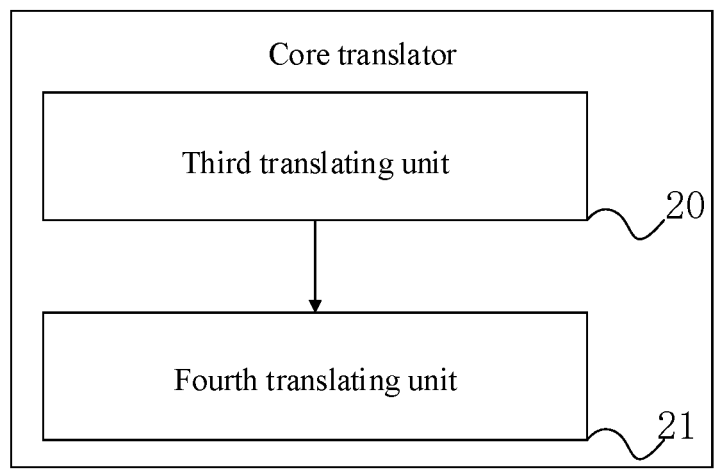
FIG. 6 is a structural diagram of the core translator according to an embodiment of the present application.

As shown in FIG. 6, the present embodiment provides a core translator, including:

a third translating unit 20 configured to receive a second-type Internet protocol message sent by a user-side translator, translate the second-type Internet protocol message into a first-type Internet protocol message, map the translated first-type Internet protocol message, and send the mapped first-type Internet protocol message to an Internet server so that the Internet server feeds back a first-type Internet protocol message configured to provide services according to the first-type Internet protocol message sent by the core translator; wherein the user-side translator is deployed at an access point of a user terminal with a first-type Internet which is a network transmitting the first-type Internet protocol messages; the core translators is deployed between an uplink line of the first-type Internet and a second-type Internet which is a network transmitting the second-type Internet protocol messages; the Internet server applies a first-type Internet protocol;

a fourth translating unit 21 configured to receive the first-type Internet protocol message fed back by the Internet server, map the first-type Internet protocol message fed back by the Internet server, translate the mapped first-type Internet protocol message into the second-type Internet protocol message, and send the translated second-type Internet protocol message to the user-side translator so that the user-side translator translates the second-type Internet protocol message into the first-type Internet protocol message, and sends the translated first-type Internet protocol message to a corresponding user terminal.

Specifically, the third translating unit 20 receives the second-type Internet protocol message sent by the user-side translator, translates the second-type Internet protocol message into the first-type Internet protocol message, maps the translated first-type Internet protocol message, and sends the mapped first-type Internet protocol message to the Internet server so that the Internet server feeds back the first-type Internet protocol message configured to provide services according to the first-type Internet protocol message sent by the core translator; wherein the user-side translator is deployed at the access point of the user terminal with the first-type Internet which is a network transmitting the first-type Internet protocol messages; the core translators is deployed between the uplink line of the first-type Internet and the second-type Internet which is a network transmitting the second-type Internet protocol messages; the Internet server applies the first-type Internet protocol; the fourth translating unit 21 receives the first-type Internet protocol message fed back by the Internet server, maps the first-type Internet protocol message fed back by the Internet server, translates the mapped first-type Internet protocol message into the second-type Internet protocol message, and sends the translated second-type Internet protocol message to the user-side translator so that the user-side translator translates the second-type Internet protocol message into the first-type Internet protocol message, and sends the translated first-type Internet protocol message to a corresponding user terminal.

By the third translating unit receiving the second-type Internet protocol message sent by the user-side translator, translating the second-type Internet protocol message into the first-type Internet protocol message, mapping the translated first-type Internet protocol message, and sending the mapped first-type Internet protocol message to the Internet server so that the Internet server feeds back the first-type Internet protocol message configured to provide services according to the first-type Internet protocol message sent by the core translator, and then by the fourth translating unit receiving the first-type Internet protocol message fed back by the Internet server, mapping the first-type Internet protocol message fed back by the Internet server, translating the mapped first-type Internet protocol message into the second-type Internet protocol message, and sending the translated second-type Internet protocol message to the user-side translator so that the user-side translator translates the second-type Internet protocol message into the first-type Internet protocol message, and sending the translated first-type Internet protocol message to the corresponding user terminal, the whole solution of the core translator provided by the embodiment of the application processes messages by means of the core translator, is convenient for the user to dynamically adjust the use of the uplink line according to the usage state of the uplink line.

The core translator of the present embodiment can execute the technical solutions of the corresponding embodiments of the traffic scheduling and processing method above. The implementation principle and technical effects of them are similar, and will not be repeated herein.

The present embodiment provides a traffic scheduling system, including:

the user-side translator and the core translator of the embodiments above.

The system is described hereinafter with a specific example:

A network has 3 uplink lines, the IPv6 prefixes and IPv4 public address pools of the corresponding core translators are respectively:

core translator A: 2001:da8:0:a::/64, 1.0.10.0/24;
core translator B: 2001:da8:0:b::/64, 1.0.11.0/24;
core translator C: 2001:da8:0:c::/64, 1.0.12.0/24.

There are 2 user-side translators, and the IPv6 prefixes and IPv4 private address pools of the corresponding user-side translators are respectively:

user-side translator Y: 3ffe:3200:5:1::/64, 10.5.1.0/24;
user-side translator Z: 3ffe:3200:5:2::/64, 10.5.2.0/24.

When an IPv4 client 10.5.1.3 on the side initiates an access to a WEB server of the IPv4 Internet, the A record queried by the domain name resolver is 3.0.0.6, and the header information of the transmitted packet is

TCP, 10.5.1.3% Y, 3 0.0.0.6#80;

After the packet passes through user-side translator Y, if core translator A is selected, the address is translated with IPv6 prefix 2001:da8:0:a::/64 of the core translator A according to RFC6052, and the header information of the transmitted packet after translation is (n1 is a port number generated randomly)

TCP, [3ffe:3200:5:1:0a05:0103::]#n1, [2001:da8:0:a:0300:0006::]#80.

The packet then passes through core translator A, the address is translated according to RFC6052, and the packet is processed with NAT. The header information of the transmitted packet is (n2 is the port number after NAT transformation)

TCP, 1.0.10.200% n2, 3.0.0.6#80.

The packet then passes through the IPv4 server, the returned header information of the packet is TCP, 3 0.0.0.6#80, 1.0.10.200% n2.

Core translator A then performs a NAT transformation on the packet returned by the IPv4 server according to the range of the IPv4 private address, and translates the address with prefix 3ffe:3200:5:1::/64 of user-side translator Y according to RFC6052. The header information of the transmitted packet is TCP, [2001:da9:0300:0006::]#80, [3ffe:3200:5:1:0a05: 0103::]#n1.

The packet then passes through user-side translator Y, and the address is translated according to RFC6052. The header information of the transmitted packet is TCP, 3.0.0.6#80, 10.5.1.3% n1.

The process is repeated until the communication is finished.

By deploying the user-side translator at the access point of the user terminal with the first-type Internet, deploying a plurality of core translators between multiple uplink lines of the first-type Internet and the second-type Internet, and allowing the user to select the corresponding core translator to process message according to the usage state of the uplink line, the traffic scheduling and processing method, the user-side translator, the core translator and the traffic scheduling system provided by the embodiments of the present application allow the user to dynamically adjust the use of uplink lines. The solution is capable of achieving the function of software-defined wide area network SD-WAN with the first-type Internet protocol/second-type Internet protocol translation technology, which is of great significance for reducing the network running cost and improving the network performance experience of the user.

Figure 7:
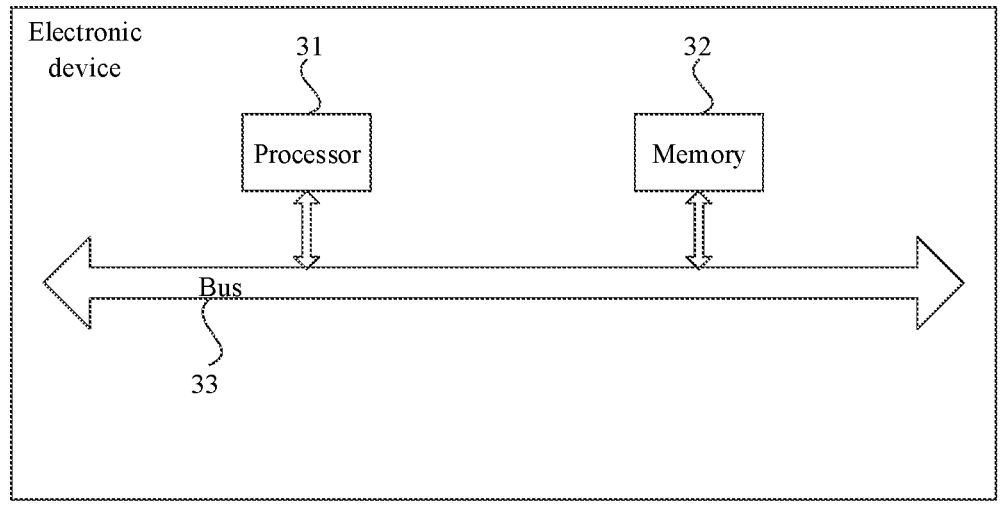
FIG. 7 is a physical structural diagram of the electronic device according to an embodiment of the present application.

FIG. 7 illustrates a physical structure of an electronic device provided by an embodiment of the present application. As shown in FIG. 7, the electronic device may include: a processor 31, a memory 32, a bus 33 and computer programs that are stored in the memory 32 and can be executed by the processor 31;

wherein the processor 31 and the memory 32 communicate with each other through the bus 33;

the processor 31 implements the methods provided by the method embodiments above when executing the computer programs. The methods, for example, includes: receiving a first-type Internet protocol message sent by a user terminal, and selecting a corresponding core translator according to a usage state of an uplink line; translating the first-type Internet protocol message into the second-type Internet protocol message, and sending the second-type Internet protocol message to the corresponding core translator; receiving the second-type Internet protocol message sent by the corresponding core translator, translating the second-type Internet protocol message into the first-type Internet protocol message, and sending the translated first-type Internet protocol message to the user terminal.

The embodiment of the present application provides a non-transitory computer readable storage medium, in which computer programs are stored. The methods provided by the method embodiments above are implemented when the computer programs are executed by a processor. The methods, for example, includes: receiving a first-type Internet protocol message sent by a user terminal, and selecting a corresponding core translator according to a usage state of an uplink line; translating the first-type Internet protocol message into the second-type Internet protocol message, and sending the second-type Internet protocol message to the corresponding core translator; receiving the second-type Internet protocol message sent by the corresponding core translator, translating the second-type Internet protocol message into the first-type Internet protocol message, and sending the translated first-type Internet protocol message to the user terminal.

Figure 8:
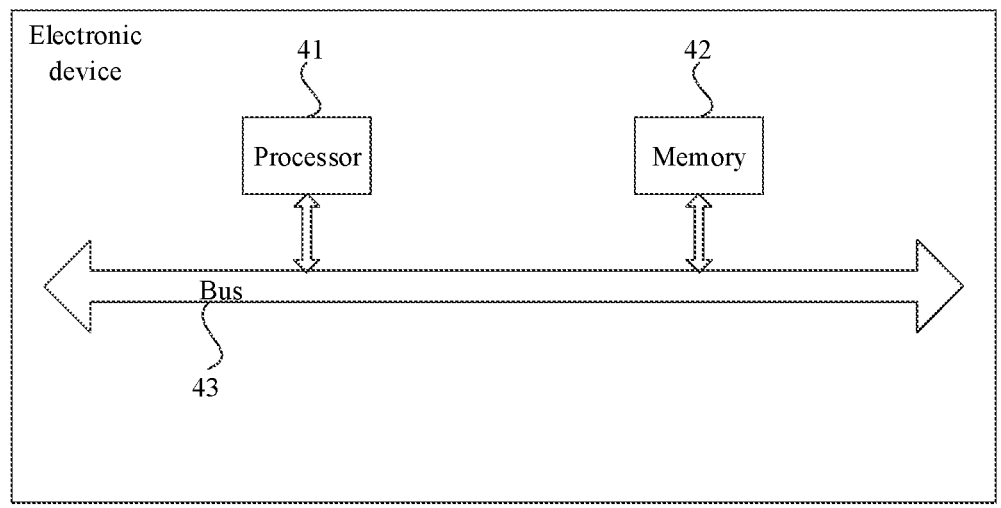
FIG. 8 is a physical structural diagram of the electronic device according to an embodiment of the present application.

FIG. 8 illustrates a physical structure of an electronic device provided by an embodiment of the present application. As shown in FIG. 8, the electronic device may include: a processor 41, a memory 42, a bus 43 and computer programs that are stored in the memory 42 and can be executed by the processor 41;

wherein the processor 41 and the memory 42 communicate with each other through the bus 43;

the processor 41 implements the methods provided by the method embodiments above when executing the computer programs. The methods, for example, includes: receiving a second-type Internet protocol message sent by a user-side translator, translating the second-type Internet protocol message into a first-type Internet protocol message, mapping the translated first-type Internet protocol message, and sending the mapped first-type Internet protocol message to an Internet server so that the Internet server feeds back a first-type Internet protocol message configured to provide services according to the first-type Internet protocol message sent by the core translator; receiving the first-type Internet protocol message fed back by the Internet server, mapping the first-type Internet protocol message fed back by the Internet server, translating the mapped first-type Internet protocol message into the second-type Internet protocol message, and sending the translated second-type Internet protocol message to the user-side translator so that the user-side translator translates the second-type Internet protocol message into the first-type Internet protocol message, and sends the translated first-type Internet protocol message to a corresponding user terminal.

The embodiment of the present application provides a non-transitory computer readable storage medium, in which computer programs are stored. The methods provided by the method embodiments above are implemented when the computer programs are executed by a processor. The methods, for example, includes: receiving a second-type Internet protocol message sent by a user-side translator, translating the second-type Internet protocol message into a first-type Internet protocol message, mapping the translated first-type Internet protocol message, and sending the mapped first-type Internet protocol message to an Internet server so that the Internet server feeds back a first-type Internet protocol message configured to provide services according to the first-type Internet protocol message sent by the core translator; receiving the first-type Internet protocol message fed back by the Internet server, mapping the first-type Internet protocol message fed back by the Internet server, translating the mapped first-type Internet protocol message into the second-type Internet protocol message, and sending the translated second-type Internet protocol message to the user-side translator so that the user-side translator translates the second-type Internet protocol message into the first-type Internet protocol message, and sends the translated first-type Internet protocol message to a corresponding user terminal.

The person skilled in the art should appreciate that the embodiments of the present application can be provided as a method, a system, or a computer program product. Therefore, the present application can be implemented in the form of an entire-hardware embodiment, an entire-software embodiment, or an embodiment in combination of software and hardware. Moreover, the application can be implemented in the form of a computer program product that can be implemented in one or more computer applicable storage mediums (including but not limited to disk storage, CD-ROM, optical storage, etc.) including computer applicable program codes.

The present application is described with reference to the flowcharts and/or block diagrams of the methods, devices (systems) and computer program products according to the embodiments of the present application. It should be appreciated that each process and/or block in the flowchart and/or block diagram, and the combinations of the process and/or block in the flowchart and/or block diagram can be implemented with computer program instructions. These computer program instructions can be provided to a processor of a general-purpose computer, a special-purpose computer, an embedded computer, or other programmable data processing device to produce a machine, so that the instructions executed by the processor of the computer or other programmable data processing device generate a system for achieving the functions designated in one or more processes in the flowchart and/or one or more blocks in the block diagram.

These computer program instructions can also be stored in a computer readable memory that can guide a computer or other programmable data processing device to operate in a particular manner, so that the instructions stored in the computer readable memory produce a manufacture including an instruction system implementing the functions designated in one or more processes in the flowchart and/or one or more blocks in the block diagram.

These computer program instructions can also be loaded onto a computer or other programmable data processing devices, so that a series of operational steps is performed on the computer or other programmable devices to generate the processing implemented by computer, so that the instructions executed on the computer or other programmable devices provides steps for achieving the functions designated in one or more processes in the flowchart and/or one or more blocks in the block diagram.

It should be noted that, in this context, relational terms such as the first type and the second type are used merely to distinguish one entity or operation from another entity or operation, and do not necessarily require or imply that such actual relationship or order exists between these entities or operations. Furthermore, the terms "include", "comprise" or any other variations thereof is intended to encompass a non-exclusive inclusion, such that a process, method, article, or device including a plurality of elements include not only those elements but also includes other elements that are not explicitly listed, or elements that are inherent to such process, method, item, or device. Without further restrictions, an element that is defined by term "including/comprising a . . . " does not exclude the presence of additional equivalent elements in the process, method, item, or device that includes the element. The orientation or position relations indicated by the terms "upper", "lower", etc. are based on the orientation or position relations shown in the drawings, which is merely for the convenience of describing the present application and simplifying the description, rather than indicates or implies that the referred system or component must have a specific orientation, or be constructed and operated in a specific orientation. Therefore it cannot be construed as limiting the present application. Unless specifically defined or limited, the terms "mount", "connect to", and "connect with" should be understood in a broad sense, for example, they may be fixed connections or may be removable connections, or integrated connections; may be mechanical connections or electrical connections; may be direct connections or indirect connections through intermediate medium, or may be internal communication of two components. For a person of ordinary skill in the art, the specific meanings of the terms above in the present application can be understood according to specific situations.

In the description of the present application, numerous specific details are set forth. However, it is to be appreciated that the embodiments of the present application may be practiced without these specific details. In some instances, well-known methods, structures and techniques are not shown in detail so as not to obscure the understanding of the description. Similarly, it should be appreciated that, in order to simplify the disclosure of the present application and facilitate the understanding of one or more of the various invention aspects, various features of the application are sometimes grouped together into a single embodiment, diagram or the description thereof in the above description of the exemplary embodiments of the present application. However, the disclosed methods should not be construed as reflecting the intention that the present application sought to be protected requires more features than those specifically recited in each of the claims. Or rather, as reflected in the claims, the inventive aspects lie in being less than all features of the single embodiment disclosed above. Therefore, the claims following the embodiments are hereby explicitly incorporated into the embodiments, and each of the claims is a separate embodiment of the present application. It should be noted that the embodiments of the present application and the features in the embodiments may be combined with each other without conflict. The present application is not limited to any single aspect, any single embodiment, or any combination and/or substitution of these aspects and/or embodiments. Moreover, each aspect and/or embodiment of the present application may be used alone or in combination with one or more other aspects and/or embodiments thereof.

Finally, it should be noted that each embodiment above is only used to illustrate rather than to limit the technical solutions of the present application; although the present application has been described in detail with reference to the foregoing embodiments, those of ordinary skill in the art should appreciate that they can still modify the technical solutions described in the foregoing embodiments, or equivalently replace some or all of the technical features therein. And these modifications or replacements do not separate the essence of the corresponding technical solutions from the spirit and scope of the technical solutions of various embodiments of the present application. They should fall within the scope of the claims and description of the present application.

The invention claimed is:

1. A traffic scheduling and processing method, comprising:
receiving a first-type Internet protocol message sent by a user terminal with a user-side translator, and selecting a corresponding core translator according to a usage state of an uplink line by selecting the corresponding core translator according to a congestion level of the uplink line, network performances, a public address usage rate of the first-type Internet protocol, a delay demand and a concurrent process demand, when determining that the first-type Internet protocol message is sent by a new communication process; wherein the user-side translator is deployed at an access point of the user terminal with a first-type Internet which is a network transmitting the first-type Internet protocol messages; a plurality of core translators are deployed between multiple uplink lines of the first-type Internet and a second-type Internet which is a network transmitting second-type Internet protocol messages; the corresponding core translator is selected from the plurality of core translators that are deployed;
translating the first-type Internet protocol message into the second-type Internet protocol message, and sending the second-type Internet protocol message to the corresponding core translator; and
receiving the second-type Internet protocol message sent by the corresponding core translator, translating the second-type Internet protocol message into the first-type Internet protocol message, and sending the translated first-type Internet protocol message to the user terminal.

2. The method of claim 1, wherein selecting the corresponding core translator according to the usage state of the uplink line further comprises:
selecting a core translator used by an old communication process sending the first-type Internet protocol message as the corresponding core translator, when determining that the first-type Internet protocol message is sent by the old communication process.

3. The method of claim 1, wherein the user-side translator and the core translator are pre-configured with prefixes of the second-type Internet protocol;
wherein translating the first-type Internet protocol message into the second-type Internet protocol message comprises:
translating the first-type Internet protocol message into the second-type Internet protocol message with a target address being the prefix of the second-type Internet protocol of the corresponding core translator and a source address being the prefix of the second-type Internet protocol of the user-side translator, according to address translation international standard RFC6052 and protocol translation international standard RFC7915.

4. The method of claim 1, wherein the first-type Internet protocol is a fourth version of Internet protocol IPv4, and the second-type Internet protocol is a sixth version of Internet Protocol IPv6.

5. A user-side translator, which is deployed at an access point of a user terminal with a first-type Internet, comprising:
a selecting unit configured to receive a first-type Internet protocol message sent by the user terminal, and select a corresponding core translator according to a usage state of an uplink line by selecting the corresponding core translator according to a congestion level of the uplink line, network performances, a public address usage rate of the first-type Internet protocol, a delay demand and a concurrent process demand, when determining that the first-type Internet protocol message is sent by a new communication process;
wherein a first-type Internet which is a network transmitting the first-type Internet protocol messages; a plurality of core translators are deployed between multiple uplink lines of the first-type Internet and a second-type Internet which is a network transmitting second-type Internet protocol messages; the corresponding core translator is selected from the plurality of core translators that are deployed;
a first-type translating unit configured to translate the first-type Internet protocol message into the second-type Internet protocol message, and send the second-type Internet protocol message to the corresponding core translator;
a second-type translating unit configured to receive the second-type Internet protocol message sent by the corresponding core translator, translate the second-type Internet protocol message into the first-type Internet protocol message, and send the translated first-type Internet protocol message to the user terminal.

6. The user-side translator of claim 5, wherein the selecting unit is configured to select a core translator used by an old communication process sending the first-type Internet protocol message as the corresponding core translator, when determining that the first-type Internet protocol message is sent by the old communication process.

7. The user-side translator of claim 5, wherein the user-side translator and the core translator are pre-configured with prefixes of the second-type Internet protocol.

8. The user-side translator of claim 7, wherein the first-type translating unit is configured to translate the first-type Internet protocol message into the second-type Internet protocol message by translating the first-type Internet protocol message into the second-type Internet protocol message with a target address being the prefix of the second-type Internet protocol of the corresponding core translator and a source address being the prefix of the second-type Internet protocol of the user-side translator, according to address translation international standard RFC6052 and protocol translation international standard RFC7915.

9. The user-side translator of claim 5, wherein the first-type Internet protocol is a fourth version of Internet protocol IPv4, and the second-type Internet protocol is a sixth version of Internet Protocol IPv6.

\* \* \* \* \*